United States Patent [19]

Klingler et al.

[11] Patent Number: 4,578,873
[45] Date of Patent: Apr. 1, 1986

[54] SENSOR HEAD WITH STOP ELEMENTS FOR ESTABLISHING STABLE REST POSITION

[75] Inventors: Otto Klingler, Oberndorf-Boll; Kurt Linder, Karlsruhe, both of Fed. Rep. of Germany

[73] Assignee: Mauser-Werke Oberndorf GmbH, Fed. Rep. of Germany

[21] Appl. No.: 727,407

[22] Filed: Apr. 25, 1985

[30] Foreign Application Priority Data

May 15, 1984 [DE] Fed. Rep. of Germany ....... 3417991

[51] Int. Cl.⁴ ................................................ G01B 7/28
[52] U.S. Cl. ........................................ 33/559; 33/556; 33/572; 33/169 R; 33/172 E
[58] Field of Search ................. 33/559, 556, 558, 561, 33/572, 172 E, 169 R

[56] References Cited

U.S. PATENT DOCUMENTS

| | | | |
|---|---|---|---|
| 3,845,561 | 11/1974 | Elsdoerfer | 33/172 E |
| 4,084,323 | 4/1978 | McMurtry | 33/561 |
| 4,471,529 | 9/1984 | Kohler | 33/559 |
| 4,523,383 | 6/1985 | Rogers et al. | 33/169 R |

FOREIGN PATENT DOCUMENTS

| | | |
|---|---|---|
| 1136555 | 4/1963 | Fed. Rep. of Germany . |
| 2611781 | 10/1976 | Fed. Rep. of Germany ........ 33/558 |
| 2356030 | 1/1977 | Fed. Rep. of Germany . |

Primary Examiner—Willis Little
Attorney, Agent, or Firm—McGlew and Tuttle

[57] ABSTRACT

In a sensor head of a measuring machine, for at least one coordinate, a straight line guiding mechanism is provided between two base parts. Springs acting in this coordinate bring the two base parts into abutment. To achieve a slackfree, stable position of rest, a stop element with a stop face for each base part is displaceable in both directions of the coordinate, counter to the action of a spring. Both stop faces point in the same direction of the coordinate. For movement, stroke lengths are free on both sides.

8 Claims, 3 Drawing Figures

SENSOR HEAD WITH STOP ELEMENTS FOR ESTABLISHING STABLE REST POSITION

FIELD AND BACKGROUND OF THE INVENTION

The present invention relates in general to sensor heads for measuring machines and in particular to such a sensor head in which, for one coordinate at least, a straight line guiding mechanism is provided which comprises a first base part and a second base part displaceable relative to the first base part in both directions of the coordinate with spring means acting in this coordinate being provided which brings the two base parts into abutment.

A simiar arrangement is described in German patent No. 11 36 555. There, by means of an extension spring, a movable plate of a spring parallogram is pulled against a stop provided on a fixed plate of the spring parallelogram. No stop is provided for the opposite direction of movement.

In German As No. 23 56 030 a sensor for workpiece probing is described, having one spring parallelogram per coodinate. Two spring loaded stop studs are mounted on a fixed base part. In the position of rest between these stop studs, balls mounted in a spring housing attached to the fixed base part, as well as a bending beam attached to the movable base part, are wedged between these stop studs. Since the stop balls as well as the bending beam apply against the same abutment area or areas, slack may result if, for example, the stop faces of the stop studs are not exactly parallel or the diameters of the stop balls and of a head ball of the bending rod differ. The means for eliminating such slack are expensive.

In German As No. 23 56 030 the bending rod has a steep force distance characteristic. The spiral springs for the balls have a flat force distance characteristic. The bending rod is to be deformed before the respective compression spring during workpiece probing.

SUMMARY OF THE INVENTION

The invention provides a sensor head in which, until a certain measuring force occurs, a stable position of rest for the movable base part is kept slackfree in both directions of the respective coordinate, by simple means.

According to the invention, a sensor head includes a single stop element, with one stop face for each base part, which is displaceable in both directions of the coordinates. One base part, under the action of a first spring and another other base part, under the action of a second spring, strike against the respective stop face. Both stop faces point in the same direction of the coordinate. For the movement of one of the base parts in one direction of the coordinate, a first stroke length is free, and for the movement of this base part together with the stop element in the other direction of the coordinate a second stroke length is free, located on the side of the stop element away from the stop face.

In the position of rest, the stop element is retained by means of one spring on the fixed base part. By means of the other the movable base part is retained on the stop element. Due to this, the position of rest is stable in both directions of the respective coordinate. Since in the position of rest both base parts apply against suitable stop faces independently of each other, the prior art problems of slack do not occur.

If upon occurrences of a certain measuring force in one direction of the coordinate the movable base part is deflected, the stop element remains at rest and the one spring becomes deformed. In case of deflection of the movable base part in the opposite direction, it takes the stop element along, as a result of which the other spring becomes deformed.

The design of the arrangement is simple. It suffices to provide a stop element whose configuration, moreover, is adaptable to the particular spatial conditions.

In a further development of the invention, such a stop element may be provided also for the second and/or third coordinate. Stable, slackfree positions of rest are then provided also for the other coordinates.

In a preferred development of the invention, the stop element spans the one base part, which applies against it on the inside. The first stroke length lies in the interior of the stop element, and the other base part applies against the stop element on the outside.

Accordingly, an object of the present invention is to provide a sensor head for a measuring machine which comprises a first base part, a second base part, first suspension means connected between the first and second base parts for permitting resilient movement therebetween in two opposite directions of at least one coordinate, a first stop element having first and second stop phases both facing in the same one of the two opposite directions, first spring means connected between the first stop element and the first base part for biasing said first stop face against said first base part, and second spring means connected between said first stop element and said second base part for biasing said second stop face against said second base part whereby a stable rest position is established with said first and second stop faces engaged said first and second base parts respectively.

A further object of the invention is to provide such a sensor head which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
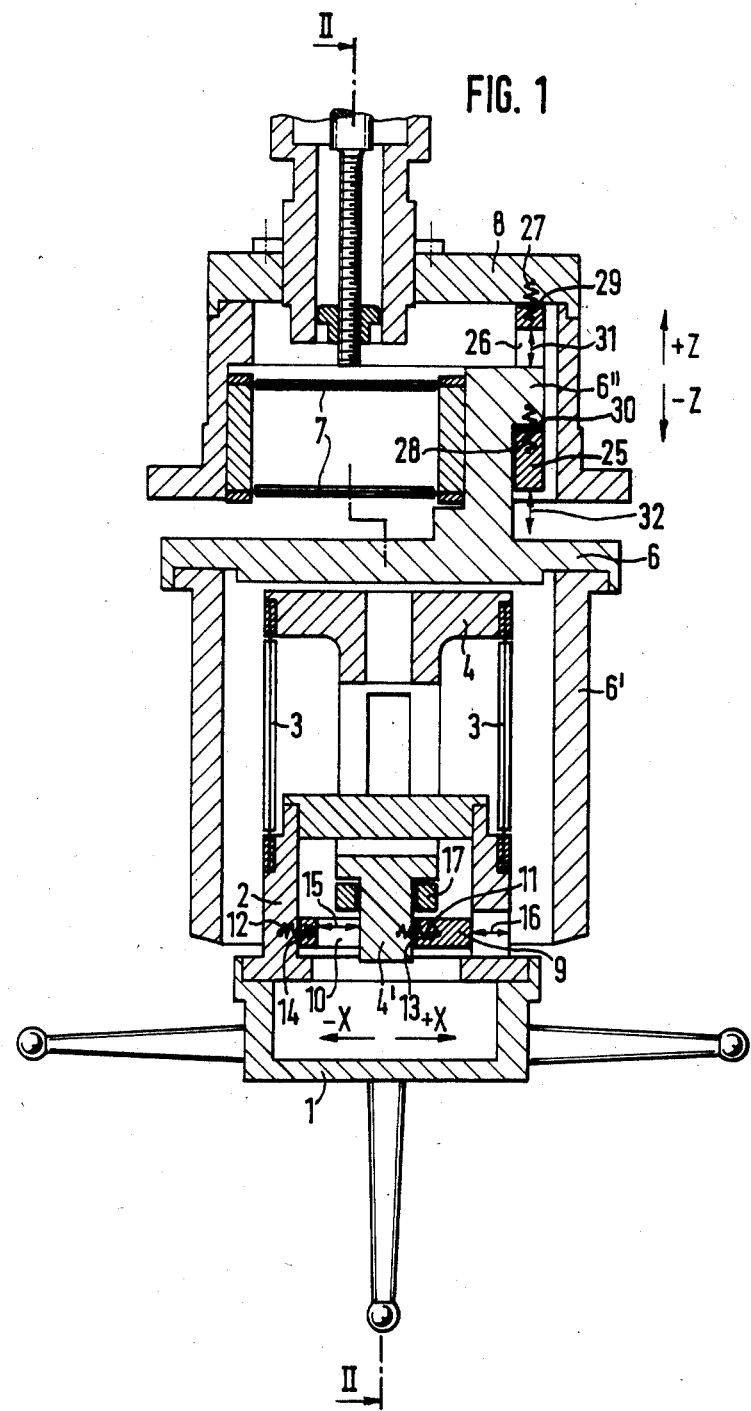
FIG. 1 is a vertical sectional view taken through a three-coordinate measuring head, taken along the line I—I of FIG. 2.

Referring to FIG. 1, the inventive sensor head comprises a sensing finger holder 1, fastened to a base part 2. By means of first suspension means in the form of x-parallelogram springs 3, the base part 2 is suspended from a base part 4 fixed in the x-coordinate. Base part 4 has a projection 4' protruding downwardly.

Base part 4 is suspended, through y-parallelogram springs 5, from a base part 6 which is fixed in the y-coordinate. At base part 6 a jacket 6' projecting downwardly formed.

Through z-parallelogram springs 7, the base part 6 is connected to a base part 8 which is fixed in the z-coordinate. In all, therefore, the sensing finger holder 1 is movable in the directions of all three coordinates relative to the base part 8.

Between base part 2 and projection 4' of base part 4, an x-stop element 9 is operatively connected. It has a cutout 10 into which projection 4' protrudes. At the projection 4' and the x-stop element 9, an extension spring 11 engages. An extension spring 12 is engaged between the x-stop element 9 and base part 2. The effective direction of both extension springs 11 and 12 lies in the x-coordinate direction. By means of the extension spring 11, a stop face 13 on the inside of the x-stop element 9 is brought into abutment with the prolongation 4'. By means of the extension spring 12, base part 2 is pulled against another stop face 14 of the x-stop element 9 which lies on the outside of the x-stop element 9. In the cutout 10 a stroke length 15 is left free. Outside of the x-stop element 9, opposite stop face 14, a stroke length 16 is left free.

Figure 2:
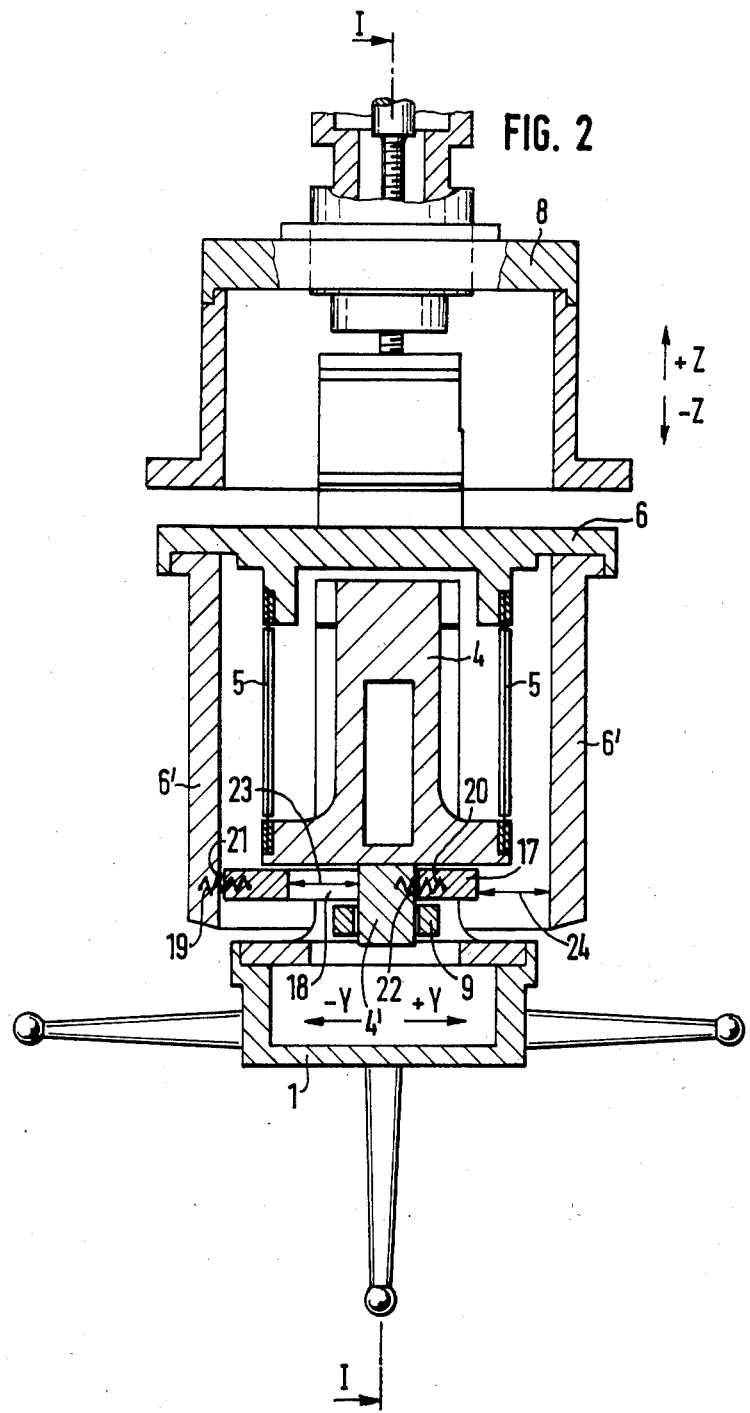
FIG. 2 is a view taken along line II—II of FIG. 1.

As shown in FIG. 2, a y-stop element 17 comprises a cutout 18 through which projection 4' projects. An extension spring 19 engages the jacket 6' of base part 6 to the y-stop element 17. The effective direction of the extension spring lies in the y-coordinate direction.

By means of the extension spring 19, an outer stop face 21 of element 17 is brought to abutment with jacket 6'. An extension spring 20 pulls projection 4' against an inner stop face 22 of the y-stop element 17. In the cutout 18 a stroke length 23 is left free. Outside the y-stop element 17, opposite stop face 21, a stroke length 24 is left free.

FIG. 1 also shows a z-stop element 25 which has a cutout 26. In it the base part 6 engages by its shoulder 6''. An extension spring 27 engages the base part 8 and the z-stop element 25. An extension spring 28 engages the z-stop element 25 and shoulder 6''. The extension spring 27 pulls the stop face 29 of the z-stop element 25 against the base part 8. The extension spring 28 pulls the shoulder 6'' against stop face 30 of the z-stop element 25. The effective direction of the extension springs 27 and 28 lies in the z-coordinate. In the cutout 26 a stroke length 31 is left free. Opposite the stop face 29 a stroke length 32 is left free.

The mode of operation of the described device is for instance as follows:

In the position shown in FIGS. 1 and 2, the sensing finger holder 1 is in its position of rest in all three coordinates.

If the sensing finger holder 1 is deflected in the +X direction, base part 2 pushes the x-stop element 9 at stop face 14 in the +X direction. At the same time stop face 13 moves away from projection 4' of the stationary base part 4. Extension spring 11 stretches.

If the sensing finger holder 1 is deflected in the −X direction, then the base part 2 moves away from the stop face 14 of the x-stop element 9. In that case, extension spring 12 stretches. The rating of the extension springs 11 and 12 determines at which measuring force there starts a deflection of the sensing finger holder 1 that is to be picked up. The possible movement in the +X direction is limited by the stroke length 16. The possible movement in the −X direction is limited by the stroke length 15.

If the sensing finger holder 1 is moved in the +Y direction, the projection 4' takes the y-stop element 17 along in the +Y direction. Its stop face 21 moves away from the jacket 6' whereby the extension spring 19 stretches.

Upon movement in the −Y direction, the projection 4' moves away from the stop face 22 of the y-stop element 17. Due to this, extension spring 20 stretches. During the movement in the −Y direction, projection 4' takes the x-stop element 9 along.

Upon movement of the sensing finger holder 1 in the +Z direction, shoulder 6'' detaches itself from the stop face 30 as spring 28 stretches.

Upon movement in the −Z direction, shoulder 6'' takes along the z-stop element 25, whose stop face 29 detaches itself from the base part 8 as extension spring 27 stretches.

With regard to the extension springs of the Y direction and of the Z direction and the stroke lengths, what has been stated concerning the X direction applies.

Figure 3:
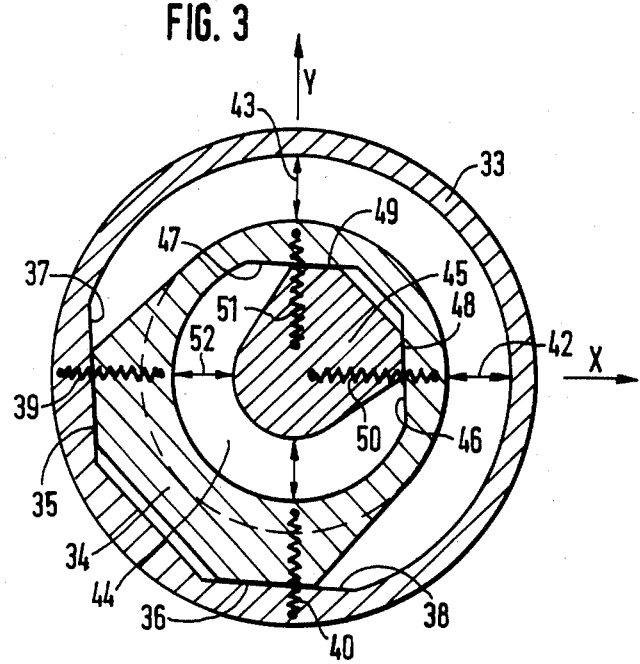
FIG. 3 is a transverse sectional view of a sensing head having a single stop element for acting in two coordinates, according to another embodiment of the invention.

In the embodiment according FIGS. 1 and 2, each coordinate has its own stop element assigned to it. In FIG. 3 a stop element is illustrated which is operative for the X-direction and the Y-direction at the same time.

In a fixed base part 33 an X,Y-stop element 34 is disposed. It comprises a stop face 35 pointing in the −X direction and a stop face 36 pointing in the −Y direction. Corresponding counter areas 37 and 38 are formed on the base part 33. The counter areas 37 and 38 are larger than the stop faces 35 and 36. An extension spring 39 pulls the stop element 34 in the −X direction against counter area 37. An extension spring 40 pulls the stop element 34 in the −Y direction against counter area 38. Opposite the stop faces 35 and 36 the stroke lengths 42 and 43, respectively, are left free.

The X,Y stop element 34 has a cutout 44 in which engages a movable base part 45 carrying sensing fingers (not shown). On cutout 44 a stop face 46 pointing in the −X direction is formed. In addition, a stop face 47 pointing in the −Y direction is provided. Corresponding counter areas 48 and 39 are formed on base part 45. These are smaller than the stop faces 46 and 47. By means of an extension spring 50, the counter area 48 is pulled against stop face 46. By means of an extension spring 51, the counter area 49 is pulled against the stop face 47. The extension springs 50 and 51 lie in X direction and Y direction, respectively. Opposite the counter areas 48 and 49 the stroke lengths 52 and 53 are left free.

In the position of rest represented in FIG. 3, the movable base part 45 strikes in the X direction and in the Y direction against the stop element 34. The latter in turn strikes in the X direction and in the Y direction against the base part 33. Due to the extension springs, this position is stable and slackfree.

When base part 45 is deflected in the +X direction, it takes along the stop element 34, whose stop face 46 slides over the counter area 38. Extension spring 39 stretches. The rating of extension spring 39 determined at which measuring force acting on the base part 45 a substantial deflection occurs. The same applies to a deflection in the +Y direction.

When base part 45 is deflected in the −X direction, its counter area 49 slides over the stop face 47 and extension spring 50 stretches. The stop element 34 does not move along. The equivalent applies to a deflection in the −Y direction.

while specific embodiments of the invention have been shown and described in detail to illustrate the application of the principles of the invention, it will be understood that the invention may be embodied otherwise without departing from such principles.

What is claimed is:

1. A sensor head for a measuring machine, comprising a first base part, a second base part, first suspension means connected between said first and second base parts for permitting resilient movement between said first and second base parts in two opposite directions of at least one coordinate, a first stop element having a first and a second stop face both facing in the same one of said two opposite directions, first spring means engaged with said first stop element and said first base part for biasing said first stop face against said first base part, and second spring means engaged to said first stop element and said second base part for biasing said second stop face against said second base part, a rest position being established between said first and second base parts in said at least one coordinate with said first and second stop faces engaged respectively against said first and second face parts, said first stop element being shaped to permit a stoke of movement in said two opposite directions between said first and second base parts.

2. A sensor head according to claim 1, including a third base part, second suspension means connected between said second and third base parts for permitting resilient movement between said second and third base parts in two opposite directions of another coordinate, a second stop element having first and second stop faces, third spring means engaged with said second stop element and said second base part for biasing said first stop face of said second stop element against said second base part, and fourth spring means engaged with said second stop element and said third base part for biasing said second stop face of said second stop element against said third base part, said second stop element being shaped to permit strokes of movement in said two opposite directions of said other coordinate between said second and third base parts.

3. A sensor head according to claim 1, wherein said first stop element includes third and fourth stop faces facing in one of two opposite directions of another coordinate, third spring means engaged with said first stop element and said first base part for biasing said third stop face against said first base part and fourth spring means engaged with said first stop element and said second part for biasing said fourth stop face against said second base part, said stop element being shaped to permit strokes of movement in said two opposite directions of said other coordinate between said first and second base parts.

4. A sensor head according to claim 1, wherein said first stop element has a cutout area defined therein, said second base part having a projection extending into said area, said second stop face of said first stop element being in said cutout area, said first stop face being on an exterior of said first stop element spaced from said cutout area, said cutout area having a length in said at least one coordinate which equals said stroke in one of said two opposite directions between said second base part and said first stop element on a side of said portion of said second base part extending into said cutout area opposite from said second stop face.

5. A sensor head according to claim 1, wherein said first and second spring means comprise first and second extension springs, said first extension spring connected between said first stop element and said first base part and said second extension spring connected between said first top element and said second base part.

6. A sensor according to claim 5, wherein said stop element includes a cutout area therein, said second stop face disposed in said cutout area, said second base part having a projection extending into said cutout area, said projection engaged against said second stop face with said first and second base parts in rest position, said cutout having a length in one direction of said at least one coordinate which equals the stroke between said first and second base parts in said one direction of said at least one coordinate.

7. A sensor head according to claim 6, including a third base part, second suspension means connected between said second and third base parts for permitting resilient movement between said second and third base parts in two opposite directions of another coordinate, a second stop element having first and second stop faces, third spring means engaged with said second stop element and said second base part for biasing said first stop face of said second stop element against said second base part, and fourth spring means engaged with said second stop element and said third base part for biasing said second stop face of said second stop element against said third base part, said second stop element being shaped to permit strokes of movement in said two opposite directions of said other coordinate between said second and third base parts.

8. A sensor head according to claim 6, wherein said first stop element includes third and fourth stop faces facing in one of two opposite directions of another coordinate, third spring means engaged with said first stop element and said first base part for biasing said third stop face against said first base part and fourth spring means engaged with said first stop element and said second part for biasing said fourth stop face against said second base part, said stop element being shaped to permit strokes of movement in said two opposite directions of said other coordinate between said first and second base parts.

* * * * *